(12) United States Patent
Stremilova et al.

(10) Patent No.: US 7,964,102 B2
(45) Date of Patent: Jun. 21, 2011

(54) TITANIUM COMPOSITION FOR WATER TREATMENT AND METHOD

(76) Inventors: Nina N. Stremilova, St. Petersburg (RU); Serguei V. Stremilov, Concord (CA)

( * ) Notice: Subject to any disclaimer, the term of this patent is extended or adjusted under 35 U.S.C. 154(b) by 330 days.

(21) Appl. No.: 12/219,992

(22) Filed: Jul. 31, 2008

(65) Prior Publication Data

US 2010/0025332 A1    Feb. 4, 2010

(51) Int. Cl.
*B01D 21/01*     (2006.01)
(52) U.S. Cl. ......... 210/723; 210/754; 210/764; 210/192
(58) Field of Classification Search .................. 210/723, 210/754, 764, 192
See application file for complete search history.

(56) References Cited

U.S. PATENT DOCUMENTS

| | | | | |
|---|---|---|---|---|
| 5,023,012 A | * | 6/1991 | Buchan et al. | 252/181 |
| 5,681,475 A | * | 10/1997 | Lamensdorf et al. | 210/666 |
| 2009/0291987 A1 | * | 11/2009 | Aitken et al. | 514/349 |

\* cited by examiner

*Primary Examiner* — Chester T Barry

(57) ABSTRACT

A personally portable water purification compound prepared in unit dosage form such as tablets, packages and the like and having titanium dioxide ($TiO_2$) in the form of fine particles, and adsorbed chlorine held at the surface of the titanium dioxide particles; and a titanium based coagulant; the compound being prepared in a plurality of unit dose size packages, for personal use by individuals. Also disclosed is a method of preparing a personally portable water purification compound consisting of the steps of heating titanium dioxide particles up to a temperature between about 260-500° C., passing a cold dry gaseous chlorine flow around the titanium dioxide particles; and cooling the titanium dioxide during the treatment. Also disclosed is a method of purifying water containing contaminants and bacteria consisting of the steps of segregating a predetermined volume of the water, introducing a first predetermined quantity of titanium dioxide particles activated with adsorbed chlorine, simultaneously introducing a second predetermined quantity of a titanium coagulant, agitating the water and releasing the chlorine from the titanium dioxide particles, the chlorine destroying the bacteria, allowing the water to stand for a predetermined dwell time, during which the titanium dioxide without chlorine attracts contaminants, and after which the titanium coagulant forms flocs into masses heavier than water which masses settle out, leaving the water purified.

13 Claims, No Drawings

TITANIUM COMPOSITION FOR WATER TREATMENT AND METHOD

FIELD OF THE INVENTION

The invention relates to the purification and disinfection of relatively small volumes of contaminated water for drinking purposes and provides an individual personal use method employing titanium compounds consisting of disinfectant and coagulant dispersed in the volume of water.

BACKGROUND OF THE INVENTION

There are known methods of preparing tableted reagents that contains chlorine or iodine compounds and are intended for in field clarification of natural water. However, such reagents only sanitize water, and the treated water has an offensive odour and taste, which causes resistance to use it. Production of such tablets is complex and the tablets have short storage life.

A known tableted composition is commercially available under Chlor-Floc (trademark), and method of its application [Reference 3 Powers E. M., Hernandez C., Boutros S. N., Harper B. G. *Biocidal Efficacy of a Flocculating Emergency Water Purification Tablet*. Appl Environ Microbiol. 1994 July: 60 (7), pp. 2316-2323]. These tablets combine disinfection with clarification by sedimentation-filtration. The chemical constituents of the tablet are similar to many that have been used by municipal water treatment plants.

US Patent [Reference 4 U.S. Pat. No. 5,681,475, B01D 15/00, Issued: Oct. 28, 1997] describes a composition in unit dosage form (powder, granular or tablet) for batchwise water purification comprising: (a) an organochlorine compound serving as a disinfectant-sanitizing agent (sodium dichloro-s-triazinetrione or sodium dichloroisocyanurate, and a combination thereof); (b) a solid inorganic metal salt (aluminum sulfate); (c) a solid alkali which in the presence of an acid serves as a dispersion-buffer agent (sodium bicarbonate); (d) a solid primary flocculant (sodium carboxymethylcellulose); (e) a solid secondary flocculant (high molecular weight polyacrylamide polymer); (f) a long fibre cellulose; and (g) a bulk ion exchange absorbent (zeolite).

Russian Federation patent [Reference 5 Russian Federation Patent No 2278827, C2 МПК C02F1/50 (2006.01) A61L 2/23 (2006.01) C02F 103/04 (2006.01), Issued: Jun. 27, 2006] claims a composition of the following compounds: sodium salt dihydrate of dichloroiso cyanuric acid in the amount of 3-250 parts by mass, succinic acid in the amount of 5-100 parts by mass and sodium chloride in the amount of 3-50 parts by mass; it also additionally contains sodium bicarbonate in the amount of 10-250 parts by mass. Another complex composition is claimed in another Russian Federation patent [Reference 6 Russian Federation Patent No 2 255 898, C17 C01F7/00, C01F7/58. Issued: Jul. 10, 2005] as well.

Disadvantages of both compositions are complex formulation thereof, difficulties in preparation, and short storage life.

A more useful technical solution is the method claimed by patents in US and Canada [Reference 1, Canadian Patent No 1 186 967, C02F1/56 (2006.01), C02F1/54 (2006.01), C02F1/52 (2006.01), Issued: May 14, 1985, and Reference 2 U.S. Pat. No. 5,023,012, C02F1/52 (20060101). Issued: Jun. 11, 1991]. The composition comprises: (a) 40-60% (by mass) aluminum sulphate as a coagulant for rapidly coagulating solid impurities dispersed in the water to form primary flocs; (b) 15-25% (by mass) sodium bicarbonate for alkalization as a coagulant promoter; (c) 2-25% (by mass) bentonite as a clay (acts as centres of sedimentation in low turbidity water); (d) 0.5-3% (by mass) sodium dichloroisocyanurate as a first micro-biocide agent; (e) 1-3% (by mass) carboxymethylcellulose for aggregating the primary flocs into larger secondary flocs; (f) 1-3% (by mass) synthetic silicon hydroxide compound; (g) 0.02-0.15% (by mass) polyacrylamide as a secondary colloid; and (h) 4% (by mass) halazone (dichlorosulfamylbenzoic acid) as a second micro-biocide agent.

The basic disadvantages of this composition are the very complex formulation, low stability of some components, insufficient aluminum sulphate effectiveness as coagulant under low temperature of treated water, and the high price of reagents. Surprisingly the present invention makes use of the well-known ability of titanium dioxide particles to adsorb and hold on its surface gaseous chlorine. Usually manufacturers of titanium dioxide, using the chloride method of production, apply significant effort to remove the chlorine. Another engineering solution for dechlorination of titanium dioxide described [Reference 9 Russian Federation Patent No 2 042 628, 6 C 01 G 23/08. Issued: 27 Aug. 1995]. The method is carried out at a mist-laden hot air flow fluidized bed and results in chlorine content decrease. Titanium dioxide obtained by this method has a low chlorine content (less than 0.2%) and is not an effective disinfectant.

Contrary to these systems, the present invention makes use of the ability of titanium dioxide to adsorb chlorine and then to release it in aqueous media, as well as the technology of surface treatment.

BRIEF SUMMARY OF THE INVENTION

According to the invention, there is provided a combination of three components:

(a) titanium dioxide ($TiO_2$), obtained by the chloride method;

(b) added chlorine under special conditions, whereby chlorine is adsorbed at the surface of fine particles of titanium dioxide;

(c) composition of polymeric compounds of titanium and other elements, called titanium coagulant (TC).

The invention also preferably incorporates other additives such dispersing agents, binders, colorants.

The invention further provides a method of preparing the composition.

The invention makes use of two well known characteristics. Titanium dioxide is widely used as adsorbent for water purification [i.e.: Reference 12. Lakshmanan D., Clifford D., Samanta G. *Arsenic removal by coagulation with aluminum, iron, titanium, and zirconium*. Journal AWWA. Vol. 100: 2 Feb. 2008. P. 76-88. And reference 13 Lokshin E. P. and Belikov M. L. *Water Purification with Titanium Compounds to Remove Fluoride Ions*. Russian Journal of Applied Chemistry, Vol. 76, No. 9, 2003, pp. 1466-1471]. Dissolved aqueous chlorine is widely used as disinfectant. The two characteristics are uniquely combined into present invention.

The method according to the invention is to produce titanium dioxide with a content of chlorine. To reach such result titanium dioxide particles (preferably right after synthesis) are heated up to 260-500° C. The particles undergo treatment by cold gaseous chlorine flow. Preferably this is in a fluidized bed. During this treatment the titanium dioxide is cooled down to room temperature and molecular chlorine is adsorbed on the surface of titanium dioxide particles and is held firmly as several adsorbed layers around each particle. When placed in water this chlorine is easy released from the particles and forms an aqueous solution. Therefore, such titanium dioxide with adsorbed chlorine works as a disinfectant. After the chlorine leaves the titanium dioxide particles surface, the titanium dioxide becomes an effective adsorbent for heavy metals ions, organic compounds and the like. Thus, water is both disinfected and purified.

The titanium coagulant composition obtained according to the patent [Reference 7 Russian Federation Patent No 2 179 954, C17 C 02 F 1/52. Issued: 27 Feb. 2002, and reference 8 International Patent No.: WO/2001/098215, C02F1/52 (2006.01), App. Num: PCT/RU2000/000391, Pub. Date: 27 Dec. 2001.] removes heavy metals, suspended solids, germs, microorganisms and the like from water more effectively than most of the commercially available coagulants.

Titanium dioxide by itself will form a stable suspension. Polymeric titanium coagulant when introduced into the mixture settles both suspended impurities as well as fine particles of titanium dioxide with adsorbed substances. When dissolved in water titanium coagulant produces large flocs that absorb suspended solids, heavy metals, organic compounds, germs and remains of germs, organochlorides (byproducts of chlorination).

The method of producing the titanium coagulant composition consists in general of introducing alkaline compounds of aluminum and/or silicon into an acid aqueous solution of titanium hydroxychloride. Zirconium hydroxide and/or silicon hydroxychloride in amounts of between about 1% and 10% by weight of composition could be introduced to improve coagulation ability of the composition. Trivalent titanium in an amount between about 2 and 10% by weight of the composition could be added to improve degree of purification from such substances as arsenic and divalent (ferric) iron ions. The mixture of abovementioned compounds is heated in two steps while stirring, to obtain polymeric composition.

The titanium dioxide, with adsorbed chlorine, and titanium coagulant (and optional additives) are mixed mechanically to obtain a homogeneous blend. The mixture may then be formed into tablets or packaged as unit dosage form in pouches or packs for further application for purification for drinking purposes of a predetermined volumes of water. The water treated is safe for drinking after the precipitate settles and is separated. All compounds included in the mixture are safe for human health and for the environment.

It is known that titanium coagulant as a part of the composition works well in a wide range of temperatures: from 4° to 40° C. Therefore, the composition is reliable and effective for most emergency situations. Moreover, the composition reaches high decontamination effects even under low reagent dose.

The titanium coagulant is available in the form of paste. When mixed with titanium dioxide there is no need for a binding substance to form tablets. The composition could be produced by various methods and with various proportions of chlorine, titanium dioxide and titanium coagulant. The composition could be used in individual or personal applications in form of tablets or granules, or as loose mixture packed in a small bags or pouches. Bulk mixture in granular or powder form could be used for small water treatment facilities.

The composition of the invention in various form (tablets, granular or powder) is stable in dry storage for a long-term. All components of the composition have been ecologically and toxicologically tested and generally accepted as non-hazardous for humans and the environment.

The composition combines in that several significant factors for water clarifying and disinfection:

(a) disinfection due to free chlorine released from the titanium dioxide surface;

(b) adsorption of impurities from the water onto the titanium dioxide surface, which is now free of chlorine;

(c) coagulation of suspended solids by the titanium coagulant followed by (d) sedimentation of coagulated flakes;

(e) absorption of impurities (include chlorination byproducts) and micro-filtration during sedimentation.

The composition provides:

(a) high level purification of natural water from toxic substances and germs;

(b) unique formula and production method;

(c) stability during storage time in dry place;

(d) ecological and health safety;

(e) portability and universality (for various application conditions: source of water, temperature, pollution level, equipment etc).

DESCRIPTION OF A SPECIFIC EMBODIMENT

Titanium dioxide in finely divided particles form, obtained by the chloride process, is taken preferably right after synthesis. The particles are placed in a reactor with a fluidized bed and heated up between 260° and 500° C. by dry hot air flow. Heating is then stopped.

Then dry gaseous chlorine at room temperature (about 20-25° C.) is introduced in the air flow. The chlorine content is increased gradually over a short period of time (1-10 min.) until it replaces air (completely or partially).

The chlorine molecules are adsorbed by the titanium dioxide particles at the surface during this stage until the temperature in the reactor drops to 20-25° C. The titanium dioxide particles are held at this temperature and chlorine flow during a period of time that depends on desirable adsorbed chlorine concentration and may be as long as a few hours. The chlorine amount may be controlled by controlling the concentration of gaseous chlorine in the air flow and by controlling the duration of the cooling stage.

The composition known as titanium coagulant is used as third component of the invention, is described in more detail in the Russia Patent No 2,179,954 [Reference 7].

The titanium coagulant basically consist of polymerized hydroxychlorides of titanium, aluminum, silicon and optionally other elements. The preferred ratio between titanium and other components in such composition is 1 to between 0.3 and 30 by weight calculated as oxides. To produce the titanium coagulant alkaline compounds of aluminum and/or silicon are introduced into an acid solution of titanium tetrachloride under heating and stirring to produce the titanium coagulant. At this stage compounds of zirconium and/or silicon in amounts between 1% and 10% by weight could be added to improve coagulation ability of the composition. A trivalent titanium compound in amounts between 0.2% and 10% by weight could be introduced to improve removal of divalent (ferric) iron and arsenic.

The titanium dioxide with adsorbed chlorine (from 0.5% to 3% by weight of $TiO_2$) obtained as a result of abovementioned process is then mixed mechanically with the titanium coagulant in an amount between 10 and 50 by weight percent of the composition to obtain a homogeneous blend.

Dispersal agents, such as dry sodium bicarbonate in a amount of 20% by weight of the composition may be added to promote solubility and increase pH. Other dispersing agents may include citric acid, sodium carbonate, vinic acid, calcium carbonate, carboxymethyl cellulose sodium salt. Other additives may include appropriate colorants and binding agents. The mixture can easily be pressed into tablets in a conventional tabletting machine or left as a loose mixture.

The tablets, or granules, or loose mechanical mixture, obtained by the method described above, are used for water purification and disinfection under conditions when other methods are not available. Typically users will be for example, campers, hikers, mariners, explorers, persons in distress from fire, hurricane, flood, or accident. Military and disaster relief agencies will also find this product useful.

For water purification the mixture is dispersed in the water, and forms flocs and these then precipitate. The amount of the mixture depends of the water volume and the expected degree of contamination.

Application of inorganic mostly titanium compounds that are harmless for humans and the environment is a significant difference from any known reagent proposed in similar situation. The titanium compounds undergo complete hydrolysis during process of water treatment and form insoluble titanium dioxide precipitate. This eliminates secondary pollution of treated water. Aluminum, silicon, zirconium and other additives form insoluble compounds as well and co-precipitate completely.

EXAMPLES

Example 1

A portion of 100 grams of titanium dioxide was treated to contain 0.5% of adsorbed chlorine. The titanium dioxide with adsorbed chlorine is mixed mechanically with 20 grams of titanium coagulant (proportion: 1 of TiO2 to 0.005 of Cl to 0.2 of titanium coagulant) to obtain a homogeneous blend. This blend was easily pressed into tablets 200 milligrams each in a conventional tabletting machine.

Typically, one 200 mg tablet is enough to treat one liter of surface water. If the water is estimated as heavily polluted (i.e. stagnant water) two tablets per 1 liter should be added. The volume is vigorously stirred until the tablet(s) dissolve. Then it is left to stand until precipitation settles down. The cleared water should be poured off to use.

Water quality was assessed according to appropriate standards [Reference 10,. US EPA. *National Drinking Water. Regulations.* http://www.epa.gov/safewater/contaminants/index.html. May 28, 2008. And Reference 11. *Guidelines for Canadian Drinking Water Quality.* Summary Table. May 2008. http://www.hc-sc.gc.ca/ewh-semt/pubs/water-eau/sum_guide-res_recom/index-eng.php. Jun. 22, 2008.]. The results are shown in Table 1.

TABLE 1

| Water | | pH | Turbidity, NTU | Colour, units | *Escherichia coli,* count per L |
|---|---|---|---|---|---|
| Source water | | 7.5 | 26 | 26 | 170 |
| After 1 tablet added, without filtration | | 7.02 | 0.75 | 4 | 0 |
| US EPA Drinking water quality standard [Reference 10] | MCL | 6.5-8.5 | 0.3/1* | 15 | 0 |
| | MCLG | 6.5-8.5 | n/a | n/a | 0 |
| Canadian Drinking Water Quality [Reference 11] | | 6.5-8.5 | 0.3/1.0/ 0.1** | ≦15 | 0 |

*Turbidity may never exceed 1 NTU, and must not exceed 0.3 NTU in 95% of daily samples in any month.
**Depends on technique of filtration: (1.) For chemically assisted filtration, shall be less than or equal to 0.3 NTU in at least 95% of the measurements made, or at least 95% of the time each calendar month, and shall not exceed 1.0 NTU at any time. (2.) For slow sand or diatomaceous earth filtration, the standard should be less than or equal to 1.0 NTU in at least 95% of the measurements made, or at least 95% of the time each calendar month, and shall not exceed 3.0 NTU at any time. (3.) For membrane filtration, shall be less than or equal to 0.1 NTU in at least 99% of the measurements made, or at least 99% of the time each calendar month, and shall not exceed 0.3 NTU at any time.

Example 2

A portion of 100 grams of titanium dioxide containing 2.7% of adsorbed chlorine is mixed mechanically with 40 grams of titanium coagulant (proportion: 1 to 0.027 to about 0.4) to obtain a homogeneous blend. This was easily be pressed into tablets 500 milligrams each in a conventional tabletting machine.

Typically, one 500 mg tablet is enough to treat one liter of surface water. If the water estimated as much polluted (i.e. stagnant water) two tablets per 1 liter should be dissolved. The volume has to be vigorously stirred until tablet(s) dissolve, than waited out until precipitation settle down. The cleared water should be poured off to use.

Water quality was assessed according to appropriate national standards. The results are shown in Table 2.

TABLE 2

| Water | | pH | Turbidity, NTU | Colour, units | *Escherichia coli,* count per L |
|---|---|---|---|---|---|
| Source water | | 7.3 | 26 | 124 | 6800 |
| After 1 tablet added, without filtration | | 6.7 | 10 | 29 | 82 |
| After 2 tablets added | | 6.5 | 2.25 | 7 | 0 |
| US EPA Drinking water quality standard [Reference 10] | MCL | 6.5-8.5 | 0.3/1* | 15 | 0 |
| | MCLG | 6.5-8.5 | n/a | n/a | 0 |
| Canadian Drinking Water Quality [Reference 11] | | 6.5-8.5 | 0.3/1.0/ 0.1** | ≦15 | 0 |

*Turbidity may never exceed 1 NTU, and must not exceed 0.3 NTU in 95% of daily samples in any month.
**Depends on technique of filtration: (1.) For chemically assisted filtration, shall be less than or equal to 0.3 NTU in at least 95% of the measurements made, or at least 95% of the time each calendar month, and shall not exceed 1.0 NTU at any time. (2.) For slow sand or diatomaceous earth filtration, shall be less than or equal to 1.0 NTU in at least 95% of the measurements made, or at least 95% of the time each calendar month, and shall not exceed 3.0 NTU at any time. (3.) For membrane filtration, shall be less than or equal to 0.1 NTU in at least 99% of the measurements made, or at least 99% of the time each calendar month, and shall not exceed 0.3 NTU at any time.

The results are evidence of a high degree water purification. Application of the tablets containing titanium compounds that disinfect source water could be any cohere in the field or in emergency situations.

The two titanium compounds (the titanium dioxide particles with surface-adsorbed chlorine and the titanium coagulant) co-application work well to clarify water with low alkaline reserve and high water contamination from organic materials such as humic acid, as well as remove almost all bacteria and plankton.

Example 3

One gram of titanium dioxide containing 2.5% of adsorbed chlorine is added to the titanium coagulant n amount from about 0.1 to about 0.5 grams (proportion: 1 to 0.025 to 0.1-0.5). The loose mixture added to 10 liters of greatly polluted water and is slowly stirred for 20 minutes then settled for about 1 hour. The cleared water should be poured off to use. The results are shown in Table 3.

TABLE 3

| Water | pH | Turbidity, NTU | Colour, units | *Escherichia coli* count per L | Total organic carbon (TOC), mg/L |
|---|---|---|---|---|---|
| Source water | 7 | 39 | 184 | 8500 | 20.3 |
| After introducing 0.3 g of titanium dioxide and 0.1 g of titanium coagulant | 6.75 | 11 | 20 | 2.4 | 6.27 |
| After introducing 0.5 g of titanium dioxide and 0.3 g of titanium coagulant | 6.55 | 1.5 | 8 | 0 | 3.66 |
| After introducing 1.0 g of titanium dioxide and 0.5 g of titanium coagulant | 6.2 | 0.75 | 4 | 0 | 2.3 |

Example 4

One gram of titanium dioxide containing 2.7% of adsorbed chlorine is added to the titanium coagulant in amount between 0.1 and 0.5 grams to form a loose mixture (proportion 1 to 0.027 to 0.1-0.5). The mixture dispersed in 10 liters of greatly polluted water, then is slowly stirred for 20 minutes, and then settled for 1 hour. The cleared water should be poured off to use. The results are shown in Table 4.

TABLE 4

| Water | pH | Turbidity, NTU | Colour, units | *Escherichia coli* count per L | Total organic carbon (TOC), mg/L |
|---|---|---|---|---|---|
| Source water | 7 | 39 | 184 | 8500 | 20.3 |
| After introducing 1 g of titanium dioxide and 0.5 g of titanium coagulant. Temperature 20° C. | 6.25 | 0.75 | 4 | 0 | 2.6 |
| After introducing 1 g of titanium dioxide and 0.5 g of titanium coagulant. Temperature 12° C. | 6.25 | 1.5 | 5 | 0 | 1.8 |
| After introducing 1.0 g of titanium dioxide and 0.5 g of titanium coagulant. Temperature 7° C. | 6.25 | 1.9 | 5 | 0 | 1.8 |

Titanium coagulant composition preferably should contain silicon or zirconium compounds to improve its performance. Presence of such compounds itself or in composition with aluminum salts dramatically improves coagulating ability of the composition.

Example 5

A portion of 100 grams of titanium dioxide containing 2.75% of adsorbed chlorine is mixed mechanically with 30 grams of titanium coagulant composition that contains zirconium compounds in amount of 5% (as zirconium dioxide) to obtain a homogeneous blend (proportion 1 to 0.0275 to 0.3 to 0.015 of Zr). This was easily pressed into tablets 500 milligrams each in a conventional tabletting machine. The tablet is dissolved to treat one liter of surface water. If the water estimated as much polluted (i.e. stagnant water) two tablets per 1 liter should be dissolved. The volume has to be vigorously stirred until tablet(s) dissolve, than waited out until precipitation settled down. The cleared water should be poured off to use. Water quality was assessed according to appropriate national standard methods. The results are shown in Table 5.

Example 6

A portion of 100 grams of titanium dioxide containing 2.75% of adsorbed chlorine is mixed mechanically with 30 grams of titanium coagulant composition that contains silicon compounds in amount of 10% (as silica) to obtain a homogeneous blend (proportion: 1 to 0.0275 to 0.3 to 0.03 of Si). This was easily pressed into tablets 500 milligrams each in a conventional tabletting machine The tablet is dissolved to treat one liter of surface water. If the water estimated as much polluted (i.e. stagnant water) two tablets per 1 liter should be dissolved. The volume has to be vigorously stirred until tablet(s) dissolve, than waited out until precipitation settled down. The cleared water should be poured off to use. The results are shown in Table 5.

Example 7

A portion of 100 grams of titanium dioxide containing 2.75% of adsorbed chlorine is mixed mechanically with 30 grams of titanium coagulant composition that contains both zirconium compounds in amount of 3% (as zirconium dioxide) and silicon compounds in amount of 5% (as silica) to obtain a homogeneous blend (proportion: 1 to 0.0275 to 0.3 to about 0.01 of $ZrO_2$ to about 0.015 of $SiO_2$). which can easily be pressed into tablets 500 milligrams each in a conventional tabletting machine or packed in pouches containing loose granulated unit doses. The tablet or unit dose is dissolved to treat one liter of surface water. If the water estimated as much polluted (i.e. stagnant water) two doses per 1 liter should be dissolved. The volume has to be vigorously stirred until tablet(s) dissolve, than waited out until precipitation settled down. The cleared water should be poured off to use.

Water quality was assessed according to appropriate national standard methods. The results are shown in Table 5.

TABLE 5

| Composition | pH | Turbidity, NTU | Colour, units | *Escherichia coli* count per L | Total organic carbon (TOC), mg/L |
|---|---|---|---|---|---|
| Source water | 7 | 39 | 184 | 8500 | 20.3 |
| Composition according with example 5: $TiO_2$ with adsorbed $Cl_2$ and titanium coagulant with $ZrO_2$ | 6.25 | 0.75 | 4 | 0 | 3.27 |
| Composition according with example 6: $TiO_2$ with adsorbed $Cl_2$ and titanium coagulant with $SiO_2$ | 6.35 | 1.5 | 5 | 0 | 2.66 |
| Composition according with example 7: $TiO_2$ with adsorbed $Cl_2$ and titanium coagulant with $ZrO_2$ and $SiO_2$ | 6.3 | 0.75 | 3 | 0 | 1.98 |

Explanation of Production Titanium Dioxide with Adsorbed Chlorine

The producing of titanium dioxide with high absorbed chlorine content consists in multilayer gas adsorption at surface of $TiO_2$ fine particles is illustrated in Example 8 and Table 6. This may be achieved by cooling of dispersed titanium dioxide within cold gaseous chlorine flow. As titanium dioxide particles are cooling down chlorine molecules form several layers on their surface.

When the tablets are placed in water the chlorine releases to aqueous phase and acts as disinfecting agent. The titanium dioxide provides after available to adsorb heavy metal ions, organic substances and other pollutants. The following examples explain the method.

Example 8

The titanium dioxide particles in form of gaseous dispersion are preliminary heated up to 250-500° C. The titanium dioxide is transported into a pneumotrench type device where it is fluidized by dry cold gaseous chlorine and air mixture under temperature of 25° C. While the dispersion is cooling down to room temperature the molecular chlorine is adsorbed and holds firmly as layer(s) on the titanium dioxide particles' surface. Cooled product is unloaded for further composition processing. Adsorbed chlorine content as function of various set of processing conditions is showed in Table 6.

TABLE 6

| Process conditions | Case 1 | Case 2 | Case 3 |
|---|---|---|---|
| Intake titanium dioxide temperature, ° C. | 250 | 400 | 500 |
| Gaseous chlorine temperature, ° C. | 30 | 24 | 20 |
| Outlet titanium dioxide temperature, ° C. | 35 | 30 | 23 |
| Adsorbed chlorine content, % | 1.35 | 2.05 | 2.94 |

What is claimed is:

1. A personally portable water purification composition prepared in unit dosage form such as tablets, and packages and comprising:

titanium dioxide ($TiO_2$) in the form of fine particles;

adsorbed chlorine held at the surface of said titanium dioxide particles, said chlorine being present as molecules of chlorine bound in surface particles of said titanium dioxide in an amount of between 0.5% and 3.0% by weight of titanium dioxide; and a titanium based coagulant, said compositiong being prepared in a plurality of unit dose size packages, for personal use by individuals.

2. A personally portable water purification composition as claimed in claim 1 wherein said titanium dioxide is present in an amount equal to between 5% and 20% by weight of the total weight of said composition.

3. A personally portable water purification composition as claimed in claim 2 wherein said titanium dioxide is present in an amount of between 5% and 20%, and wherein said titanium coagulant is present in an amount of between 70% and 95% by weight of the composition.

4. A personally portable water purification composition as claimed in claim 3 wherein said titanium coagulant is a composition consisting of quadrivalent titanium compounds and at least one of metals selected from I-VI and VIII groups of the periodic system, and/or at least one compound of metal selected from V group of the periodic system.

5. A personally portable water purification composition as claimed in claim 1 wherein said composition is formed as tablets in a weight of between 250 milligrams and 500 milligrams.

6. A personally portable water purification composition as claimed in claim 1 wherein said composition is in the form of a powder and is packed in individual single use packages of predetermined size between about 250 milligrams and 500 milligrams by weight.

7. A personally portable water purification composition as claimed in claim 3 wherein an additive includes dispersing agent selected from the group consisting of citric acid, sodium carbonate, vinic acid, calcium carbonate, carboxymethyl cellulose sodium salt or combinations thereof.

8. A personally portable water purification composition as claimed in claim 7 wherein said dispersing agent is present in an amount of between 1% and 15% by weight of the entire composition.

9. A method of preparing a water purification compound and comprising the steps of:

heating titanium dioxide particles up to a temperature between about 260-500° C.;

passing a cold dry gaseous chlorine flow around said titanium dioxide particles; and cooling said titanium dioxide during said treatment, wherein said chlorine is present as molecules of chlorine bound in surface particles of said titanium dioxide in an amount of between 0.5% and 3.0% by weight of titanium dioxide.

10. A method of preparing a water purification compound as claimed in claim 9 and further comprising the steps of placing said titanium dioxide particles on a fluidized bed, and heating as aforesaid, and passing said gaseous chlorine flow through said fluidized bed, around said titanium dioxide particles.

11. A method of preparing a water purification compound as claimed in claim 10 and further captivity of gaseous chlorine on surface of said titanium dioxide particles by pending them in airflow heated and after discontinuing heating, and progressively adding chlorine to said airflow to provide a gas stream of decreasing temperature and increasing chlorine content until the temperature drops to around 25° C.

12. A method of preparing a water purification compound as claimed in claim 11 characterizing by titanium dioxide particles with adsorbed chlorine are mixed mechanically with titanium coagulant, and optional dispersing agent, and/or optional binding agent, and/or optional colorant to obtain a homogeneous mixture.

13. A method of preparing a water purification compound as claimed in claim 12 characterizing in that the mixture of titanium dioxide, and adsorbed chlorine, and titanium coagulant, and optional additives portioned to obtain unit doses in form of tablets, or granules, or capsules, or pouches.

* * * * *